United States Patent
Park et al.

(10) Patent No.: US 11,705,578 B2
(45) Date of Patent: Jul. 18, 2023

(54) ELECTROLYTE HAVING DIFFERENTIAL ION CONDUCTIVITY AND LITHIUM SECONDARY BATTERY COMPRISING SAME

(71) Applicant: LG CHEM, LTD., Seoul (KR)

(72) Inventors: Eunkyung Park, Daejeon (KR); Yeilin Ham, Daejeon (KR); Minchul Jang, Daejeon (KR); Byoungkuk Son, Daejeon (KR); Bora Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 392 days.

(21) Appl. No.: 16/962,201

(22) PCT Filed: Oct. 31, 2019

(86) PCT No.: PCT/KR2019/014529
§ 371 (c)(1),
(2) Date: Jul. 14, 2020

(87) PCT Pub. No.: WO2020/091435
PCT Pub. Date: May 7, 2020

(65) Prior Publication Data
US 2021/0066752 A1   Mar. 4, 2021

(30) Foreign Application Priority Data

Oct. 31, 2018   (KR) .................. 10-2018-0131593
Oct. 31, 2019   (KR) .................. 10-2019-0137092

(51) Int. Cl.
*H01M 10/0565*   (2010.01)
*H01M 10/0525*   (2010.01)
*H01M 4/02*   (2006.01)

(52) U.S. Cl.
CPC ... *H01M 10/0565* (2013.01); *H01M 10/0525* (2013.01); *H01M 2004/027* (2013.01); *H01M 2300/0082* (2013.01)

(58) Field of Classification Search
CPC ..................... H01M 10/0565; H01M 10/0525
See application file for complete search history.

(56) References Cited

U.S. PATENT DOCUMENTS

2004/0209159 A1   10/2004   Lee et al.
2010/0273062 A1   10/2010   Tsuchida et al.
(Continued)

FOREIGN PATENT DOCUMENTS

CN   101877418 A   11/2010
CN   107004901 A   8/2017
(Continued)

OTHER PUBLICATIONS

International Search Report for PCT/KR2019/014529 (PCT/ISA/210) dated Feb. 12, 2020.
(Continued)

*Primary Examiner* — Christopher P Domone
*Assistant Examiner* — Jonathan William Estes
(74) *Attorney, Agent, or Firm* — Birch, Stewart, Kolasch & Birch, LLP

(57) ABSTRACT

A lithium secondary battery including a negative electrode, a positive electrode, a first electrolyte layer facing the negative electrode; and a second electrolyte layer present on the first electrolyte layer, wherein the first electrolyte layer has a higher ion conductivity than the second electrolyte layer, and a lithium secondary battery comprising the electrolyte described above.

10 Claims, 1 Drawing Sheet

(56) References Cited

U.S. PATENT DOCUMENTS

| | | |
|---|---|---|
| 2013/0095380 A1 | 4/2013 | Affinito et al. |
| 2013/0260257 A1 | 10/2013 | Choi |
| 2017/0294671 A1 | 10/2017 | Jin et al. |
| 2018/0159169 A1 | 6/2018 | Ko et al. |
| 2018/0248189 A1* | 8/2018 | Pan .................. H01M 10/0525 |
| 2020/0127319 A1 | 4/2020 | Kil |

FOREIGN PATENT DOCUMENTS

| | | | |
|---|---|---|---|
| CN | 107636880 A | 1/2018 | |
| CN | 107732297 A | 2/2018 | |
| CN | 108598560 A | 9/2018 | |
| KR | 10-2018-0015841 A | 2/2001 | |
| KR | 2002-0085942 A | 11/2002 | |
| KR | 10-0368438 B1 | 1/2003 | |
| KR | 10-2004-0090561 A | 10/2004 | |
| KR | 10-2013-0111833 A | 10/2013 | |
| KR | 10-2014-0083024 A | 7/2014 | |
| KR | 10-2014-0112597 A | 9/2014 | |
| KR | 10-2016-0051196 A | 5/2016 | |
| KR | 10-2017-0123727 A | 11/2017 | |
| KR | 10-1850901 B1 | 4/2018 | |
| KR | 10-1865834 B1 | 6/2018 | |
| KR | 10-2018-0076709 A | 7/2018 | |
| KR | 10-2018-0092180 A | 8/2018 | |
| KR | 20180104126 A * | 9/2018 | |
| WO | WO 2013/137224 A1 | 9/2013 | |
| WO | WO 2017/074116 A1 | 5/2017 | |
| WO | WO-2017074116 A1 * | 5/2017 | .......... H01M 10/052 |

OTHER PUBLICATIONS

European Patent Office Search Report dated May 11, 2021 for family application EP19878800.2.

* cited by examiner

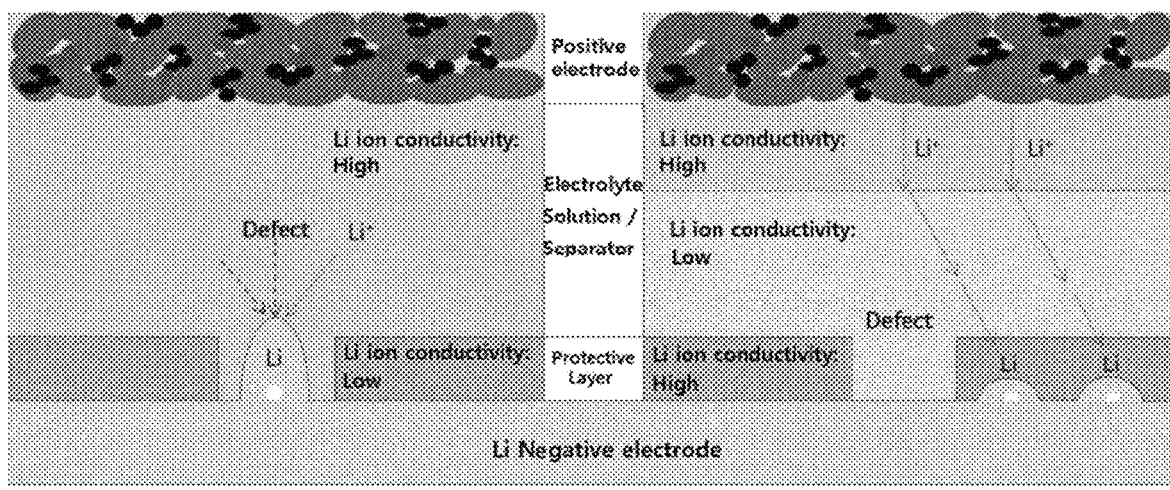

ELECTROLYTE HAVING DIFFERENTIAL ION CONDUCTIVITY AND LITHIUM SECONDARY BATTERY COMPRISING SAME

TECHNICAL FIELD

The present application claims the benefits of priorities based on Korean Patent Application No. 10-2018-0131593 filed on Oct. 31, 2018 and Korean Patent Application No. 10-2019-0137092 filed on Oct. 31, 2019, the entire contents of which are incorporated herein by reference.

The present invention relates to an electrolyte having a differential ion conductivity and a lithium secondary battery comprising the same.

BACKGROUND ART

The demand for secondary batteries is increasing in various applications as a power source for PCs, video cameras and mobile phones, or as a power source for electric vehicles or power storage media. Since the lithium secondary battery among the secondary batteries particularly has a higher capacity density than other secondary batteries and can operate even at high voltage, it is a secondary battery for miniaturization and light weight, and is generally used for information-related devices and communication devices. In recent years, the development of lithium secondary batteries having high output and high capacity for electric vehicles or hybrid vehicles is underway.

In general, the lithium secondary battery is configured by embedding an electrode assembly comprising a positive electrode, a negative electrode, and a separator interposed between the positive electrode and the negative electrode in a battery case in a stacked or wound structure and injecting a nonaqueous electrolyte solution into the battery case. As the negative electrode, a lithium electrode is used by attaching a lithium foil onto a flat current collector.

However, the lithium secondary battery has irregular lithium formation and removal during the proceeding of the charging and discharging, thereby resulting in the formation of lithium dendrites, which causes continuous capacity degradation and is an important cause of the short circuit of the battery.

Therefore, various methods have been sought to solve the above problem. Specifically, researches have been conducted, which introduce a polymer protective layer or an inorganic solid protective layer into a lithium metal layer, or increase the concentration of salts in electrolyte solution or apply appropriate additives. However, the inhibitory effect of lithium dendrites by these methods is insignificant.

PRIOR ART DOCUMENT

Patent Document

Korean Laid-open Patent Publication No. 2016-0051196

DISCLOSURE

Technical Problem

The present invention has been made to solve the above problems of the prior art, and it is an object of the present invention to provide a new concept electrolyte that can significantly inhibit the growth of dendrites due to the difference in ion conductivity by comprising two or more electrolyte layers having different ion conductivity from each other.

In addition, it is another object of the present invention to provide a lithium secondary battery having improved operation characteristics, lifetime characteristics, and safety by comprising the electrolyte described above.

Technical Solution

In order to achieve the above objects, the present invention provides a lithium secondary battery comprising a negative electrode, a positive electrode; a first electrolyte layer facing the negative electrode; and a second electrolyte layer present on the first electrolyte layer, wherein the first electrolyte layer has a higher ion conductivity than the second electrolyte layer.

In addition, the present invention provides a lithium secondary battery comprising the electrolyte described above.

Advantageous Effects

The new concept electrolyte of the present invention comprises two or more electrolyte layers having different ion conductivity from each other, thereby providing an effect of significantly inhibiting the growth of dendrites by the difference in ion conductivity.

In addition, the lithium secondary battery of the present invention provides improved operation characteristics, lifetime characteristics, and safety by comprising the electrolyte described above.

DESCRIPTION OF DRAWING

The Figure schematically illustrates the structure and mechanism of a conventional lithium secondary battery (left) and a lithium secondary battery (right) of the present invention.

BEST MODE

Hereinafter, the present invention will be described in detail with reference to the accompanying drawing so that those skilled in the art can easily carry out the present invention. However, the present invention can be embodied in various different forms, and is not limited thereto.

In the drawing, in order to clearly illustrate the present invention, parts that are not related to the description of the present invention are omitted, and similar reference numerals are used for similar parts throughout the specification. Also, the size and relative size of the components shown in the figures are independent of the actual scale and may be reduced or exaggerated for clarity of description.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

If the present specification states that a layer is "on" another layer or substrate, such a layer may be formed directly on the other layer or substrate, or a third layer may be interposed therebetween. Also, in the present specification, the directional expression of the upper side, the upper (part), and the upper surface can be understood as meaning the lower side, lower (part), lower surface, etc. depending on the criteria. That is, the expression of the spatial direction should be understood as being a relative direction, and should not be interpreted to mean an absolute direction.

In addition, it is to be understood that the terms "comprise", "contain" or "have", etc., as used in the present specification, are intended to designate the presence of stated features, numbers, components, or combinations thereof, but not to preclude the possibility of the presence or addition of one or more other features, numbers, components, or combinations thereof.

In the drawing, the thicknesses of layers and regions may be exaggerated or omitted for clarity. The same reference numerals represent the same components throughout the specification.

Also, in the following description of the present invention, if it is thought that detailed descriptions of related known functions or configurations may unnecessarily obscure the subject matter of the present invention, such detailed descriptions will be omitted.

The present invention comprises an electrolyte comprising: a first electrolyte layer facing a negative electrode; and a second electrolyte layer located on the first electrolyte layer, wherein the first electrolyte layer has a higher ion conductivity than the second electrolyte layer.

In the electrolyte of the present invention, the first electrolyte layer may have an ion conductivity of $10^{-5}$ to $10^{-2}$ S/cm, and the second electrolyte layer may have an ion conductivity of $10^{-6}$ to $10^{-3}$ S/cm.

In addition, the difference in the ion conductivity between the first electrolyte layer and the second electrolyte layer may be 2 to $10^4$ times, preferably 3 to $10^3$ times, more preferably 5 to $10^2$ times, still more preferably 10 to $10^2$ times.

If the difference in the ion conductivity is lower than the lower limit of the above-described range, the effect of inhibiting the growth of lithium dendrites becomes insignificant. If the difference in the ion conductivity exceeds the upper limit, the operation efficiency of the battery is lowered, which is not preferable.

Generally, in the case of the lithium secondary battery that uses lithium metal or a material containing lithium metal as a negative electrode for the lithium secondary battery, first, degeneration of the battery proceeds rapidly due to growth of lithium dendrites, reactivity of lithium with an electrolyte solution, or other side reactions. Second, when a protective layer is formed on the surface of the negative electrode in order to solve the above problems, if a defect occurs in the protective layer, a short circuit of the battery occurs while the growth of lithium dendrites is accelerated in the defect generated region.

As a result of considerable efforts to solve the above problems, the inventors of the present invention have found that as shown in FIG. 1, if the protective layer has a higher ion conductivity than the electrolyte layer in contact with the protective layer, even when a defect occurs in the protective layer, since lithium ions are not concentrated on the defect site (left side of FIG. 1), and are plated on the lithium-based negative electrode through the protective layer around the defect generated region having the higher ion conductivity (right side of FIG. 1), it is possible to prevent the rapid growth of lithium dendrites, and thus have completed the present invention.

Therefore, the electrolyte of the present invention is characterized in that the ion conductivity of the first electrolyte layer facing the negative electrode (also referred to as the protective layer) is higher than that of the second electrolyte layer.

The protective layer must satisfy a condition that lithium ions can be moved, but current cannot flow, and thus it can be understood as an electrolyte layer. Therefore, the first electrolyte layer in the present invention is defined as having a function of the protective layer.

In the electrolyte of the present invention, at least one of the first electrolyte layer and the second electrolyte layer is characterized by being a semi-solid electrolyte or solid electrolyte. The reason is that when both the first electrolyte layer and the second electrolyte layer are in the liquid phase, the first electrolyte layer and the second electrolyte layer are mixed and thus it is difficult to obtain the desired effect in the present invention.

In the electrolyte of the present invention, the first electrolyte layer may have a thickness of 0.1 to 20 μm, more preferably 0.1 μm to 10 μm. If the thickness is smaller than the above range, it may be difficult to perform a function as a protective layer. If the thickness is larger than the above range, the interfacial resistance may be increased, thereby causing deterioration of battery characteristics.

In addition, the second electrolyte layer may have a thickness of 0.1 μm to 50 μm, more preferably 0.1 μm to 30 μm. If the thickness is smaller than the above range, it may be difficult to perform a function as an electrolyte. If the thickness is larger than the above range, the interfacial resistance may be increased, thereby causing deterioration of battery characteristics.

In the electrolyte of the present invention, the electrolyte may further comprise one or more electrolyte layers formed on the second electrolyte layer. In this case, it doesn't matter if the ion conductivity of the at least one electrolyte layer is higher than that of the first electrolyte layer. Rather, if the ion conductivity is higher, the operation performance of the battery may be further improved. This is because the object of the present invention can be achieved from the ion conductivity relationship of the first electrolyte layer and the second electrolyte layer.

In the electrolyte of the present invention, the electrolyte layer facing the positive electrode, among the one or more electrolyte layers formed on the second electrolyte layer, may have a feature that its ion conductivity is higher than that of the second electrolyte layer.

If the ion conductivity of the electrolyte layer facing the positive electrode is high as described above, since the conduction of Li ions intercalated and deintercalated at the positive electrode is fast, the operation performance of the battery can be preferably further improved, for example, the resistance is reduced during charging/discharging, and the rate characteristic of the battery is improved.

In the electrolyte of the present invention, the electrolyte layer facing the positive electrode, among the one or more electrolyte layers formed on the second electrolyte layer, may have an ion conductivity of $10^{-5}$ to $10^{-2}$ S/cm, more preferably $10^{-4}$ to $10^{-2}$ S/cm.

In one embodiment of the invention, the one or more electrolyte layers formed on the second electrolyte layer are composed of one electrolyte layer, and this electrolyte layer may be in the form of facing the positive electrode.

The electrolyte of the present invention may be in a state where a separator is interposed between electrolytes. Also, in this case, the separator may be interposed in a form impregnated with electrolyte.

In one embodiment of the invention, the second electrolyte layer may itself be formed in a form that performs a function as a separator, the separator may be formed in the second electrolyte layer, or the separator may be impregnated with a second electrolyte. However, it is not limited to these forms.

In the electrolyte of the present invention, the first electrolyte layer may be preferably formed of a semi-solid electrolyte or an all solid electrolyte, in consideration of its function as a protective layer. As the semi-solid electrolyte and all solid electrolyte, that known in the art may be used without limitation as long as it meets the condition of the ion conductivity defined above.

In the electrolyte of the present invention, the second electrolyte layer may be formed of a liquid phase electrolyte, a semi-solid electrolyte, or an all solid electrolyte. If the liquid phase electrolyte, semi-solid electrolyte, and all solid electrolyte satisfy the ion conductivity conditions defined above, electrolytes known in the art may be used without limitation.

In the electrolyte of the present invention, the negative electrode may be a lithium-based electrode. Here, the lithium-based electrode may comprise not only a pure lithium electrode but also a lithium compound, a lithium alloy, and a lithium mixture.

The present invention also relates to a lithium secondary battery comprising the electrolyte of the present invention.

The lithium secondary battery of the present invention may be manufactured in various forms such as a battery containing a liquid phase electrolyte, a semi-solid battery, and an all solid-state battery.

The lithium secondary battery of the present invention can be constructed by any known technique in the art, except that it comprises the electrolyte described above. Therefore, among the contents exemplified below, other components except for those related to electrolyte, i.e., the positive electrode, the negative electrode, the separator and the like are those exemplified to explain the lithium secondary battery of the present invention, and are not limited in the present invention.

As a negative electrode of the lithium secondary battery of the present invention, lithium metal may be used alone, or one formed by stacking a negative electrode active material on a negative electrode current collector may be used.

In this case, the negative electrode active material may be any one selected from the group consisting of lithium metal, a lithium alloy, a lithium metal composite oxide, a lithium-containing titanium composite oxide (LTO), and a combination thereof. The lithium alloy may be an alloy of lithium and at least one metal selected from Na, K, Rb, Cs, Fr, Be, Mg, Ca, Sr, Ba, Ra, Al, and Sn. Also, the lithium metal composite oxide is an oxide ($MeO_x$) of lithium and any one metal (Me) selected from the group consisting of Si, Sn, Zn, Mg, Cd, Ce, Ni, and Fe and for example, may be $Li_xFe_2O_3$ ($0<x\leq1$) or $Li_xWO_2$ ($0<x\leq1$).

In addition, the negative electrode active material may be metal composite oxides such as $Sn_xMe_{1-x}Me'_yO_z$ (Me: Mn, Fe, Pb, Ge; Me': Al, B, P, Si, elements of groups 1, 2 and 3 of the periodic table, halogen; $0<x\leq1$; $1\leq y\leq3$; $1\leq z\leq8$); oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$, and carbon-based negative electrode active materials such as crystalline carbon, amorphous carbon, or carbon composite may be used alone or in combination of two or more.

The negative electrode current collector is not particularly limited as long as it has electrical conductivity without causing chemical changes in the battery. For example, copper, stainless steel, aluminum, nickel, titanium, sintered carbon; copper or stainless steel whose surface is treated with carbon, nickel, titanium, silver or the like; aluminum-cadmium alloy or the like may be used as the negative electrode current collector. In addition, the form of the negative electrode current collector can be various forms such as a film, sheet, foil, net, porous body, foam, nonwoven fabric and the like having fine irregularities formed on the surface, as with the positive electrode current collector.

The positive electrode of the lithium secondary battery of the present invention may have a form in which a positive electrode active material is stacked on a positive electrode current collector.

The positive electrode current collector is not particularly limited as long as it has high electrical conductivity without causing chemical changes in the relevant battery. For example, stainless steel, aluminum, nickel, titanium, sintered carbon, or aluminum or stainless steel whose surface is treated with carbon, nickel, titanium, silver or the like may be used.

The positive electrode active material can be varied depending on the use of the lithium secondary battery, and lithium transition metal oxides such as $LiNi_{0.8-x}Co_{0.2}AlxO_2$, $LiCo_yMn_yO_2$, $LiNi_xCo_yO_2$, $LiNi_xMn_yO_2$, $LiNi_xCo_yMn_zO_2$, $LiCoO_2$, $LiNiO_2$, $LiMnO_2$, $LiFePO_4$, $LiCoPO_4$, $LiMnPO_4$, and $Li_4Ti_5O_{12}$; chalcogenides such as $Cu_2Mo_6S_8$, FeS, CoS, and MiS; and oxides, sulfides, or halides such as scandium, ruthenium, titanium, vanadium, molybdenum, chromium, manganese, iron, cobalt, nickel, copper, zinc may be used, and more specifically, $TiS_2$, $ZrS_2$, $RuO_2$, $Co_3O_4$, $Mo_6S_8$, $V_2O_5$ etc. may be used, but the present invention is not limited thereto.

The binder contained in the positive electrode is not particularly limited, and fluorine-containing binders such as polyvinylidene fluoride (PVDF) and polytetrafluoroethylene (PTFE) can be used.

The content of the binder is not particularly limited as long as the positive electrode active material can be fixed thereby, and may be in the range of 0 to 10% by weight based on the entire positive electrode.

The positive electrode may additionally contain electrically conductive materials. The electrically conductive materials are not particularly limited as long as they can improve the electrical conductivity of the positive electrode, and examples thereof may include nickel powder, cobalt oxide, titanium oxide, and carbon. Examples of the carbon may include any one or one or more selected from the group consisting of Ketjen black, acetylene black, furnace black, graphite, carbon fiber, and fullerene.

In this case, the content of the electrically conductive materials may be selected in consideration of other conditions of the battery such as the type of the electrically conductive materials, and for example, may be in the range of 1 to 10% by weight with respect to the entire positive electrode.

The separator used in the lithium secondary battery of the present invention enables the transport of lithium ions between the positive electrode and the negative electrode while separating or insulating the positive electrode and the negative electrode from each other. The separator may be made of a porous, nonconductive, or insulating material. The separator may be an independent member such as a film or a thin film as an insulator having high ion permeability and mechanical strength, or may be a coating layer added to the positive electrode and/or the negative electrode. Also, when a solid electrolyte such as a polymer is used as an electrolyte, the solid electrolyte may also serve as a separator.

The separator preferably has a pore diameter of 0.01 to 10 µm and a thickness of 5 to 300 µm. Glass electrolyte, polymer electrolyte or ceramic electrolyte, etc., can be used as the separator. For example, olefin-based polymers such as polypropylene having chemical resistance and hydrophobicity, a sheet or nonwoven fabric made of glass fiber or polyethylene, Kraft paper and the like are used. Representative examples currently available on the market comprise Celgard series (Celgard® 2400, 2300 product from Hoechest Celanese Corp.), polypropylene separator (product from Ube Industries Ltd. or product from Pall RAI), polyethylene series (Tonen or Entek), and the like.

The electrolyte separator in the solid state may comprise less than about 20 wt. % of non-aqueous organic solvent. In this case, an appropriate gelling agent may be further comprised to reduce the fluidity of the organic solvent. Representative examples of such gelling agent may comprise polyethylene oxide, polyvinylidene fluoride, and polyacrylonitrile, etc.

The liquid phase electrolyte, semi-solid electrolyte, or all solid electrolyte used in the lithium secondary battery of the present invention may be, for example, in the following form. However, it is not limited to these.

The non-aqueous electrolyte containing lithium salt is composed of a lithium salt and an electrolyte solution. The electrolyte solution may be a non-aqueous organic solvent, an organic solid electrolyte, an inorganic solid electrolyte or the like.

The lithium salt of the present invention is a substance which can be easily dissolved in a non-aqueous organic solvent, and for example, may comprise at least one selected from the group consisting of LiSCN, LiCl, LiBr, LiI, $LiPF_6$, $LiBF_4$, $LiSbF_6$, $LiAsF_6$, $LiB_{10}Cl_{10}$, $LiCH_3SO_3$, $LiCF_3SO_3$, $LiCF_3CO_2$, $LiClO_4$, $LiAlCl_4$, $Li(Ph)_4$, $LiC(CF_3SO_2)_3$, $LiN(FSO_2)_2$, $LiN(CF_3SO_2)_2$, $LiN(C_2F_5SO_2)_2$, $LiN(SFO_2)_2$, $LiN(CF_3CF_2SO_2)_2$, lithium chloroborane, lithium lower aliphatic carboxylate, lithium tetraphenyl borate, lithium imide, and combinations thereof.

The concentration of the lithium salt may be 0.2 to 2 M, preferably 0.6 to 2 M, more preferably, 0.7 to 1.7 M, depending on various factors such as the exact composition of the electrolyte mixture, the solubility of the salt, the conductivity of the dissolved salt, the charging and discharging conditions of the battery, the operating temperature and other factors known in the lithium battery field. If the concentration of the lithium salt is less than 0.2 M, the conductivity of the electrolyte may be lowered and thus the performance of the electrolyte may be deteriorated. If the concentration of the lithium salt exceeds 2 M, the viscosity of the electrolyte may increase and thus the mobility of the lithium ion ($Li^+$) may be reduced.

The non-aqueous organic solvent should dissolve the lithium salt well, and the non-aqueous organic solvent may comprise, for example, aprotic organic solvents such as N-methyl-2-pyrrolidinone, propylene carbonate, ethylene carbonate, butylene carbonate, dimethyl carbonate, diethyl carbonate, ethyl methyl carbonate, gamma-butyrolactone, 1,2-dimethoxyethane, 1,2-diethoxyethane, tetrahydroxy franc, 2-methyl tetrahydrofuran, dimethylsulfoxide, 1,3-dioxolane, 4-methyl-1,3-dioxen, diethylether, formamide, dimethylformamide, dioxolane, acetonitrile, nitromethane, methyl formate, methyl acetate, phosphate triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate, and these organic solvents can be used alone or in a mixed solvent form of two or more solvents thereof.

As the organic solid electrolyte, for example, polyethylene derivatives, polyethylene oxide derivatives, polypropylene oxide derivatives, phosphate ester polymers, poly agitation lysine, polyester sulfide, polyvinyl alcohol, polyvinylidene fluoride, polymers comprising ionic dissociation groups and the like can be used.

As the inorganic solid electrolyte, for example, nitrides, halides, sulfates and the like of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$-$Li_2S$—$SiS_2$ may be used.

To the electrolyte of the present invention, for example, pyridine, triethylphosphite, triethanolamine, cyclic ether, ethylene diamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxy ethanol, or aluminum trichloride, etc. may also be added for the purpose of improving charging/discharging characteristics, flame retardancy, and the like. In some cases, a halogen-containing solvent such as carbon tetrachloride, ethylene trifluoride or the like can be also added for the purpose of imparting nonflammability, and carbon dioxide gas can be further comprised for the purpose of improving storage characteristics at a high temperature, and fluoroethylene carbonate (FEC), propene sultone (PRS), fluoropropylene carbonate (FPC) and the like can be further comprised.

The manufacture of the lithium secondary battery having the configuration as described above is not particularly limited in the present invention, and it can be manufactured through a known method.

For example, in the form of an all solid-state cell, the cell is assembled by placing the electrolyte of the invention between the positive electrode and the negative electrode and then compression-molding it.

The assembled cell is installed in an exterior packing material and then sealed by heat compression or the like. As exterior packing material, laminate packs made of aluminum, stainless steel, etc., or a cylindrical or rectangular metal container may suitably be used.

Hereinafter, preferred examples of the present invention will be described in order to facilitate understanding of the present invention. It will be apparent to those skilled in the art, however, that the following examples are only illustrative of the present invention and various changes and modifications can be made within the scope and spirit of the present invention, and that such variations and modifications are within the scope of the appended claims.

EXAMPLES 1 TO 2 AND COMPARATIVE EXAMPLES 1 TO 3

Manufacture of Lithium Secondary Battery

The electrolyte of the negative electrode side having the constitution of Table 1 was cast on a release film to form a film. After casting, the film was dried for 8 hours in a vacuum at 60° C. to remove the solvent sufficiently. Then, the film was transferred to the surface of lithium at a temperature of 60° C. to form a electrolyte (first electrolyte layer) of 2 µm of the negative electrode side on the lithium metal electrode of 30 µm (shape of laminate of 20 µm thick Li and 10 µm thick Cu).

Next, the intermediate electrolyte having the constitution of Table 1 was cast onto the release film and then vacuum-drying at room temperature for 24 hours to completely remove the solvent. Thereafter, in the case of Examples 1 and 2, the formed film was crosslinked at 80° C. for 1 hour, and then transferred onto the electrolyte (first electrolyte layer) of the negative electrode side to form an intermediate electrolyte (second electrolyte layer) which acts as a separator at the same time. In the case of Comparative Examples 1 to 3, the film was vacuum-dried at room temperature for 24 hours, and then the solvent-removed film was transferred onto the electrolyte (first electrolyte layer) of the negative electrode side to form an intermediate electrolyte (second electrolyte layer) which acts as a separator at the same time.

Thereafter, a LiFePO$_4$ (LFP) positive electrode material: an electrically conductive material (carbon black):an electrolyte of the positive electrode side (third electrolyte layer) were mixed at a weight ratio of 75.82:4.21:19.97 and cast onto a current collector of 20 μm thick aluminum foil, and then vacuum-dried at room temperature to completely remove the solvent and thus prepare a composite of the positive electrode and electrolyte.

The composite of the positive electrode and the electrolyte was laminated with the intermediate electrolyte (second electrolyte layer), and then, a coin cell was prepared and stored at 60° C. for 1 day, and then used for the experiment.

TABLE 1

| | Constitution | Ion conductivity (S/cm), 60° C. | Preparation method |
|---|---|---|---|
| Example 1 | Electrolyte of positive electrode side (third electrolyte layer) | 6 × 10$^{-4}$ | Branched PEO polymer + LiTFSI, Weight ratio of PEO polymer:LiTFSI = 6.1:3.9 <Structure of PEO polymer> —(CH$_2$—CH$_2$—O—CH$_2$—CH—O)$_n$— \| CH$_2$ \| O—(CH$_2$—CH$_2$—O)$_2$—CH$_3$ Two PEOs on the branch (3 to 4 PEO is also available) Solvent: Acetonitrile The solid content of the polymer and the Li salt is 15 wt. % relative to the solvent, and the film is formed by solution casting after the preparation of the solution. |
| | Intermediate electrolyte (second electrolyte layer) | 3 × 10$^{-5}$ | PEO (Molecular weight: 1,000,000):PEGDA (80:20), (Mole ratio of EO:Li$^+$ = 16:1) LiFSI Solvent: Acetonitrile, Initiator: benzoyl peroxide (2 wt. %) The solid content of the polymer and the Li salt is 20 wt. % relative to the solvent, and the film is formed by solution casting after the preparation of the solution and then crosslinked for 1 hour at 80° C. |
| | Electrolyte of negative electrode side (first electrolyte layer) | 3 × 10$^{-4}$ | PEO (Molecular weight: 1,000,000), (Mole ratio of EO:Li$^+$ = 20:1) LiFSI solvent: Acetonitrile, The solid content of the polymer and the Li salt is 20 wt. % relative to the solvent, and the film is formed by solution casting after the preparation of the solution. |
| Example 2 | Electrolyte of positive electrode side (third electrolyte layer) | 6 × 10$^{-4}$ | Prepared in the same manner as in Example 1 |
| | Intermediate electrolyte (second electrolyte layer) | 1 × 10$^{-4}$ | PEO (Molecular weight: 1,000,000):PEGDA (90:10), (Mole ratio of EO:Li$^+$ = 20:1) LiFSI Solvent: Acetonitrile, Initiator: benzoyl peroxide (2 wt. %) The solid content of the polymer and the Li salt is 20 wt. % relative to the solvent, and the film is formed by solution casting after the preparation of the solution and then crosslinked for 1 hour at 80° C. |
| | Electrolyte of negative electrode side (first electrolyte layer) | 3 × 10$^{-4}$ | Prepared in the same manner as in Example 1 |
| Comparative Example 1 | Electrolyte of positive electrode side (third electrolyte layer) | 6 × 10$^{-4}$ | Prepared in the same manner as in Example 1 |
| | Intermediate electrolyte (second electrolyte layer) | 8 × 10$^{-4}$ | PEO (Molecular weight: 1,000,000): SiO$_2$ (20 wt. %), LiFSI (Mole ratio of EO:Li$^+$ = 20:1) Solvent: Acetonitrile, The solid content of the polymer and the Li salt is 15 wt. % relative to the solvent, and the film is formed by solution casting after the preparation of the solution. |
| | Electrolyte of negative electrode side (first electrolyte layer) | 3 × 10$^{-4}$ | Prepared in the same manner as in Example 1 |

TABLE 1-continued

| | Constitution | Ion conductivity (S/cm), 60° C. | Preparation method |
|---|---|---|---|
| Comparative Example 2 | Electrolyte of positive electrode side (third electrolyte layer) | $6 \times 10^{-4}$ | Prepared in the same manner as in Example 1 |
| | Intermediate electrolyte (second electrolyte layer) | $3 \times 10^{-4}$ | PEO (Molecular weight: 1,000,000), (mole ratio of EO:Li$^+$ = 20:1) LiFSI Solvent: Acetonitrile, The solid content of the polymer and the Li salt is 20 wt. % relative to the solvent, and the film is formed by solution casting after the preparation of the solution |
| | Electrolyte of negative electrode side (first electrolyte layer) | $3 \times 10^{-4}$ | Prepared in the same manner as in intermediate electrolyte (second electrolyte layer) |
| Comparative Example 3 | Electrolyte of positive electrode side (third electrolyte layer) | $6 \times 10^{-4}$ | Prepared in the same manner as in Example 1 |
| | Intermediate electrolyte (second electrolyte layer) | $3 \times 10^{-5}$ | Prepared in the same manner as in Example 1 |
| | Electrolyte of negative electrode side (first electrolyte layer) | $3 \times 10^{-5}$ | Prepared in the same manner as in intermediate electrolyte (second electrolyte layer) |

EXPERIMENTAL EXAMPLE 1

Evaluation of the Performance of the Electrolyte

In Table 1, the ion conductivity of each electrolyte is shown as the average value of the ion conductivity of three cells obtained by solution-coating each electrolyte to prepare a SUS/electrolyte/SUS cell and put it in a 60° C. constant temperature chamber, measuring the impedance resistance in the frequency range of 1 MHz to 1 Hz (potentiostat from a biologics company), and then calculating the ion conductivity by the thickness and area of each electrolyte.

Ion conductivity (s/cm)=thickness/(area×resistance)

The coin cells of Examples 1 to 2 and Comparative Examples 1 to 3 were measured for the time point of the short occurrence and discharging capacity while charging and discharging at 0.1 C at 60° C. and the results are shown in Table 2 below.

TABLE 2

Short occurrence experiment at 60° C. (LFP/third electrolyte/second electrolyte/first electrolyte/Li)

| | Ion conductivity of third electrolyte layer | Ion conductivity of second electrolyte layer | Ion conductivity of first electrolyte layer relative to second electrolyte layer | Ion conductivity of first electrolyte layer | Time point of short occurrence | Expression of discharging capacity | LFP (3.8 V cut) |
|---|---|---|---|---|---|---|---|
| Example 1 | $6 \times 10^{-4}$ | $3 \times 10^{-5}$ | High | $3 \times 10^{-4}$ | 73 cycles | 153 | Reference 156 mAh/g |
| Example 2 | | $1 \times 10^{-4}$ | High | $3 \times 10^{-4}$ | 25 cycles | 152 | |
| Comparative Example 1 | | $8 \times 10^{-4}$ (SiO$_2$ filler) | Low | $3 \times 10^{-4}$ | 4 cycles | 153 | |
| Comparative Example 2 | | $3 \times 10^{-4}$ | Same | $3 \times 10^{-4}$ | 5 cycles | 158 | |
| Comparative Example 3 | | $3 \times 10^{-5}$ | Same | $3 \times 10^{-5}$ | 10 cycles | 148 | |

As confirmed in Table 2, it can be seen that in the case of the batteries of Examples 1 and 2 comprising the electrolyte of the present invention, the time point of short occurrence is significantly delayed as compared to Comparative Examples 1 to 3 without decreasing the capacity relative to the reference capacity.

EXAMPLE 3 AND COMPARATIVE EXAMPLE 4

Preparation of Lithium Secondary Battery

In the case of the lithium secondary batteries of Example 3 and Comparative Example 4, the positive electrode was prepared by coating a slurry formed by mixing LCO positive electrode material:electrically conductive material (carbon black):binder (PVDF) in an NMP solvent in a weight ratio of 95:2.5:2.5, on a 20 μm aluminum foil. The negative electrode was a 30 μm lithium metal electrode (shape of laminate of 20 μm thick Li and 10 μm thick Cu).

In the case of Example 3, the intermediate electrolyte (second electrolyte layer) between the positive electrode and the negative electrode is used as a separator, and different types of electrolyte solutions were injected into the electrolyte (third electrolyte layer) of the positive electrode side and the electrolyte (first electrolyte layer) of the negative electrode side to manufacture cells and evaluate them. Cycles were charged and discharged at 0.2 C at room temperature, and the results are shown in Table 3 below.

Electrolyte Used In Example 3

Electrolyte (third electrolyte layer) of positive electrode side: EC:DEC:DMC (25:50:25) $LiPF_6$ 1M VC 2 wt. %

Intermediate electrolyte (second electrolyte layer): PEG-MEA/PEGDA (15:5):SN:LiTFSI=weight ratio of 20:40:40

Electrolyte (first electrolyte layer) of negative electrode side: DMC LiFSI 2.8M In the case of Comparative Example 4, the cell was prepared and evaluated using EC:DEC:DMC (25:50:25) $LiPF_6$ 1M VC 2 wt. % as the electrolyte solution without distinguishing the electrolyte layers. Cycles were charged and discharged at 0.2 C at room temperature, and the results are shown in Table 3 below.

The full names of the components abbreviated in the present invention are as follows:

PEGDA: Poly(ethylene glycol) diacrylate

PEGMEA: Poly(ethylene glycol) methyl ether acrylate

SN: Succinonitrile

DMC: Dimethyl Carbonate

TABLE 3

Short occurrence experiment at room temperature (LCO/third electrolyte/second electrolyte/first electrolyte/Li)

| | Ion conductivity of third electrolyte layer | Ion conductivity of second electrolyte layer (porosity 48.8%) | Ion conductivity of first electrolyte layer relative to second electrolyte layer | Ion conductivity of first electrolyte layer | Time point of short occurrence |
|---|---|---|---|---|---|
| Example 3 | $8 \times 10-3$ | $2 \times 10^{-4}$ | High | $10 \times 10^{-3}$ | 20 cycles |
| Comparative Example 4 | | $8 \times 10^{-3}$ | Same | $8 \times 10^{-3}$ | 2 cycles |

As confirmed in Table 3, it can be seen that in the case of the battery of Example 3 comprising the electrolyte of the present invention, the time point of short occurrence is significantly delayed as compared to Comparative Example 4.

The invention claimed is:

1. An electrolyte comprising:
   a first electrolyte layer configured to face a negative electrode; and
   a second electrolyte layer present on the first electrolyte layer,
   wherein an ion conductivity of the first electrolyte layer is 5 to $10^2$ times that of the second electrolyte layer.

2. The electrolyte according to claim 1, wherein the first electrolyte layer has an ion conductivity of $10^{-5}$ S/cm to $10^{-2}$ S/cm, and the second electrolyte layer has an ion conductivity of $10^{-6}$ S/cm to $10^{-3}$ S/cm.

3. The electrolyte according to claim 1, wherein at least one of the first electrolyte layer and the second electrolyte layer is a semi-solid electrolyte or a solid electrolyte.

4. The electrolyte according to claim 1, wherein the first electrolyte layer has a thickness of 0.1 μm to 20 μm and the second electrolyte layer has a thickness of 0.1 μm to 50 μm.

5. The electrolyte according to claim 1, further comprising one or more electrolyte layers present on the second electrolyte layer.

6. The electrolyte according to claim 5, wherein among the one or more electrolyte layers present on the second electrolyte layer, the electrolyte layer configured to face a positive electrode has higher ion conductivity than the second electrolyte layer.

7. The electrolyte according to claim 6, wherein the one or more electrolyte layers present on the second electrolyte layer are a third electrolyte layer.

8. The electrolyte according to claim 6, wherein among the one or more electrolyte layers present on the second electrolyte layer, the electrolyte layer configured to face the positive electrode has an ion conductivity of $10^{-5}$ S/cm to $10^{-2}$ S/cm.

9. The electrolyte according to claim 1, wherein the negative electrode is a lithium-based negative electrode.

10. A lithium secondary battery comprising the electrolyte of claim 1.

* * * * *